US012584446B2

(12) United States Patent 
Barre et al.

(10) Patent No.: US 12,584,446 B2 
(45) Date of Patent: Mar. 24, 2026

(54) UNIDIRECTIONAL FAN BRAKE FOR A GAS TURBINE ENGINE

(71) Applicant: General Electric Company, Schenectady, NY (US)

(72) Inventors: Eric Barre, Cincinnati, OH (US); Brandon W. Miller, Middletown, OH (US); Arthur W. Sibbach, Boxford, MA (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/488,420

(22) Filed: Oct. 17, 2023

(65) Prior Publication Data

US 2024/0426250 A1 Dec. 26, 2024

Related U.S. Application Data

(60) Provisional application No. 63/509,449, filed on Jun. 21, 2023.

(51) Int. Cl.
| | |
|---|---|
| *F02C 7/36* | (2006.01) |
| *F01D 21/00* | (2006.01) |
| *F02K 3/04* | (2006.01) |
| *F02K 3/06* | (2006.01) |

(52) U.S. Cl.
CPC .............. *F02C 7/36* (2013.01); *F01D 21/006* (2013.01); *F02K 3/04* (2013.01); *F02K 3/06* (2013.01); *F05D 2260/40* (2013.01); *F05D 2260/4023* (2013.01); *F05D 2260/902* (2013.01)

(58) Field of Classification Search
CPC ... F02K 3/04; F02K 3/06; F02K 3/065; F02K 3/08; F02C 7/36; F01D 21/006; F05D 2260/4023 
See application file for complete search history.

(56) References Cited

U.S. PATENT DOCUMENTS

| | | | |
|---|---|---|---|
| 3,441,116 A | 4/1969 | Quenneville |
| 4,845,483 A | 7/1989 | Negishi |
| 5,349,814 A | 9/1994 | Ciokajlo et al. |
| 7,662,059 B2 | 2/2010 | McCune |
| 7,815,536 B2 | 10/2010 | Jansen et al. |
| 7,849,668 B2 | 12/2010 | Sheridan |

(Continued)

FOREIGN PATENT DOCUMENTS

FR 3111671 A1 12/2021

*Primary Examiner* — Alain Chau 
(74) *Attorney, Agent, or Firm* — Venable LLP; Michael C. Sanko; Michele V. Frank

(57) ABSTRACT

A turbine engine has a longitudinal centerline axis. The turbine engine includes a fan, a turbo-engine, and a unidirectional brake. The fan includes a plurality of fan blades that rotate in a first direction about the longitudinal centerline axis. The turbo-engine includes a combustor that combusts compressed air and fuel to generate combustion gases and a low-pressure turbine including a low-pressure shaft. The low-pressure turbine receives the combustion gases to rotate the low-pressure turbine. The fan is coupled to the low-pressure shaft such that rotation of the low-pressure shaft causes the fan to rotate in the first direction. A unidirectional brake is coupled to the low-pressure shaft to prevent rotation of the low-pressure shaft and, thus, the fan in a second direction opposite the first direction.

20 Claims, 7 Drawing Sheets

(56)  References Cited

U.S. PATENT DOCUMENTS

| | | | | |
|---|---|---|---|---|
| 7,854,305 | B2 | 12/2010 | Smetana et al. | |
| 7,883,438 | B2 | 2/2011 | McCune | |
| 8,007,253 | B2 | 8/2011 | Dooley | |
| 8,169,100 | B2 | 5/2012 | Dooley | |
| 8,307,626 | B2 | 11/2012 | Sheridan | |
| 8,425,372 | B2 * | 4/2013 | Lemmers, Jr. | F02C 7/36 |
| | | | | 475/5 |
| 8,702,373 | B1 | 4/2014 | Valva et al. | |
| 8,955,335 | B2 | 2/2015 | Burns | |
| 9,086,055 | B2 | 7/2015 | Subramaniam et al. | |
| 9,903,227 | B2 | 2/2018 | Cigal | |
| 9,970,352 | B2 * | 5/2018 | Sheridan | F02C 7/36 |
| 10,041,498 | B2 * | 8/2018 | Otto | F04D 25/045 |
| 10,113,482 | B2 * | 10/2018 | Poulin | F02C 3/113 |
| 10,167,873 | B2 | 1/2019 | Sheridan et al. | |
| 10,196,926 | B2 | 2/2019 | Ketchum et al. | |
| 10,208,624 | B2 | 2/2019 | Duong et al. | |
| 10,267,233 | B2 | 4/2019 | Mastro | |
| 10,316,855 | B2 * | 6/2019 | Mastro | F04D 29/329 |
| 10,371,007 | B2 | 8/2019 | Cigal et al. | |
| 10,513,949 | B2 | 12/2019 | Parnin et al. | |
| 10,526,913 | B2 | 1/2020 | Roberge | |
| 10,526,975 | B2 * | 1/2020 | Howell | F02C 7/36 |
| 10,570,824 | B2 | 2/2020 | Schwarz et al. | |
| 10,577,974 | B2 | 3/2020 | Valva et al. | |
| 10,634,053 | B2 | 4/2020 | Schwarz et al. | |
| 10,801,413 | B2 | 10/2020 | Roberge | |
| 11,015,522 | B2 * | 5/2021 | Poulin | F16H 3/66 |
| 11,092,037 | B2 | 8/2021 | Valva et al. | |
| 11,415,063 | B2 | 8/2022 | Morgan et al. | |
| 11,827,368 | B2 * | 11/2023 | Dubreuil | B64D 35/08 |
| 2007/0199331 | A1 | 8/2007 | Maguire et al. | |
| 2009/0045024 | A1 | 2/2009 | Ruth | |
| 2010/0167863 | A1 * | 7/2010 | Lemmers, Jr. | F02C 7/32 |
| | | | | 475/150 |
| 2011/0168494 | A1 | 7/2011 | Subramaniam et al. | |
| 2012/0015776 | A1 * | 1/2012 | Lemmers, Jr. | F01D 21/006 |
| | | | | 74/411.5 |
| 2013/0195603 | A1 * | 8/2013 | Sheridan | F02C 3/107 |
| | | | | 415/18 |
| 2016/0003143 | A1 * | 1/2016 | Sheridan | F02C 3/107 |
| | | | | 415/123 |
| 2017/0284220 | A1 * | 10/2017 | Roberge | F02C 7/32 |
| 2017/0356452 | A1 * | 12/2017 | Mastro | F16D 41/07 |
| 2017/0356525 | A1 * | 12/2017 | Mitrovic | F16H 1/20 |
| 2018/0135512 | A1 * | 5/2018 | Poulin | F16H 3/54 |
| 2018/0149091 | A1 * | 5/2018 | Howell | B64D 27/12 |
| 2019/0264617 | A1 * | 8/2019 | Barmichev | F02K 3/06 |
| 2019/0353105 | A1 * | 11/2019 | Sheridan | F02K 3/04 |
| 2019/0376416 | A1 | 12/2019 | Mastro | |
| 2020/0158213 | A1 * | 5/2020 | Leque | F16H 3/724 |
| 2020/0224606 | A1 * | 7/2020 | Dierksmeier | F16H 48/22 |
| 2020/0307818 | A1 * | 10/2020 | Dubreuil | B60W 20/40 |
| 2021/0222628 | A1 * | 7/2021 | Devendorf | F02C 6/206 |
| 2022/0297844 | A1 | 9/2022 | Mackin et al. | |
| 2023/0383700 | A1 * | 11/2023 | Hanrahan | B64D 27/10 |

* cited by examiner

UNIDIRECTIONAL FAN BRAKE FOR A GAS TURBINE ENGINE

CROSS REFERENCE TO RELATED APPLICATIONS

This application claims priority to U.S. Provisional Application No. 63/509,449, filed Jun. 21, 2023, the entire contents of which are hereby incorporated by reference.

TECHNICAL FIELD

The present disclosure relates generally to a unidirectional fan brake for a gas turbine engine.

BACKGROUND

A turbine engine generally includes a fan and a core section arranged in flow communication with one another. The fan includes a plurality of fan blades that rotate about a longitudinal centerline axis of the engine.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Figure 1:
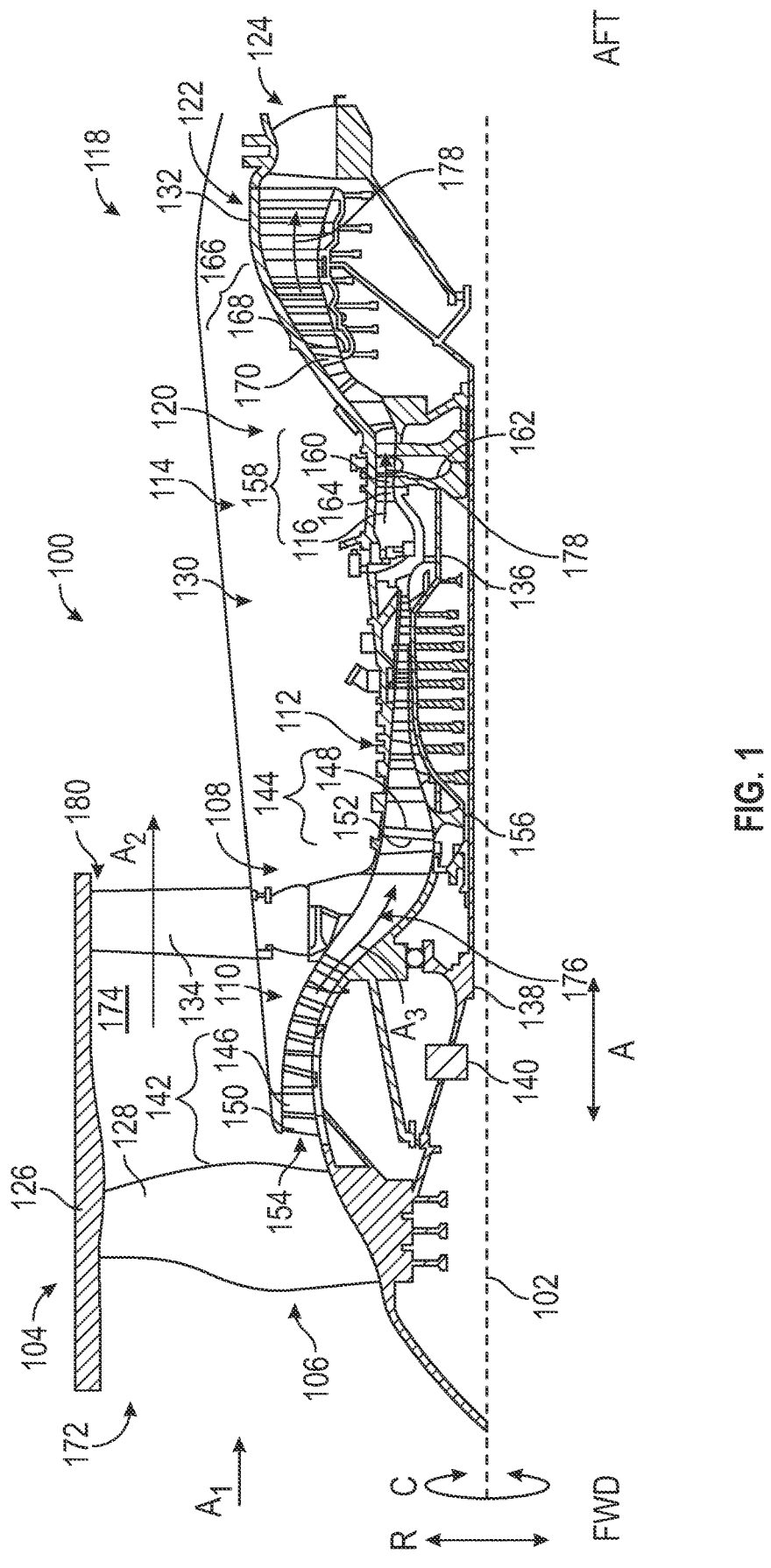
FIG. 1 illustrates a schematic, cross-sectional view of a ducted, indirect-drive gas turbine engine, taken along a longitudinal centerline axis of the engine, according to the present disclosure.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the spirit and the scope of the present disclosure.

As used herein, the terms "first" and "second" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a turbine engine or a vehicle, and refer to the normal operational attitude of the turbine engine or the vehicle. For example, with regard to a turbine engine, forward refers to a position closer to an engine inlet and aft refers to a position closer to an engine nozzle or an exhaust.

As used herein, the terms "low," "mid" (or "mid-level"), and "high," or their respective comparative degrees (e.g., "lower" and "higher", where applicable), when used with compressor, turbine, shaft, fan, or turbine engine components, each refers to relative pressures, relative speeds, relative temperatures, and/or relative power outputs within an engine unless otherwise specified. For example, a "low power" setting defines the engine configured to operate at a power output lower than a "high power" setting of the engine, and a "mid-level power" setting defines the engine configured to operate at a power output higher than a "low power" setting and lower than a "high power" setting. The terms "low," "mid" (or "mid-level"), or "high" in such aforementioned terms may additionally, or alternatively, be understood as relative to minimum allowable speeds, pressures, or temperatures, or minimum or maximum allowable speeds, pressures, or temperatures relative to normal, desired, steady state, etc., operation of the engine.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein. The terms include integral and unitary configurations (e.g., blisk rotor blade systems).

The singular forms "a," "an," and "the" include plural references unless the context clearly dictates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

As used herein, "windmill" or "windmilling" is a condition when the fan and the low-pressure shaft of the turbine engine continue to rotate at low speeds, while the high-pressure shaft rotates slowly or even stops. Windmilling can occur when the turbine engine is shutdown, but air still flows across the fan, such as during an in-flight engine shutdown or when the turbine engine is on the ground and the fan is rotating in the presence of wind when the turbine engine is shutdown. Windmilling on the ground can occur in a reverse direction from a fan rotation direction that produces positive thrust during engine operation.

During engine operation, a gearbox assembly of a turbine engine is utilized to transfer power and torque from a turbine shaft, such as a low-pressure shaft, to the fan of the turbine engine. The gearbox assembly is an epicyclic gear assembly and includes a gear assembly including a sun gear, two or more planet gears secured by a planet carrier, and a ring gear. For example, the gear assembly can be configured in a star arrangement in which the ring gear rotates, and the planet carrier is held stationary. In some embodiments, the gear assembly is configured in a planetary arrangement in which the ring gear is held stationary, and the planet carrier rotates such that the plurality of planet gears rotates about a longitudinal centerline axis of the turbine engine. In operation, the gearbox assembly transfers the torque transmitted from the turbine shaft operating at a first speed to a fan shaft rotating at a second, lower speed. Such a gearbox assembly can be utilized in turbine engines for propelling aircraft, such as commercial aircraft, or the like. The gearbox assembly can also be utilized as an accessory gearbox to transmit torque and power to one or more accessories of the turbine engine or of the aircraft.

The gearbox assembly includes one or more bearings that allow rotation of the plurality of planet gears about the one or more bearings. A lubrication system supplies lubricant (e.g., oil) to the gearbox assembly for lubricating various components of the gearbox assembly, such as, for example, the gears and the bearings. The bearings may be, for example, but not limited to, hydrodynamic journal bearings or roller bearings. The bearings typically require a steady supply of lubricant during all operational phases of the turbine engine in order to properly lubricate the bearings to prevent damage due to sliding contact for hydrodynamic journal bearings or even for the generic gear mesh interface. The gearbox assembly may experience long duration, continued rotation following a shutdown of the turbine engine, such as that occurring during windmilling. In such instances, the gears and the bearings can be affected by not receiving enough lubricant for lubricating the gears and the bearings. For example, during windmilling, the rotational speed of the shafts may be too low to power the lubricant pump to pump the lubricant to the gearbox assembly. In some instances, e.g., during operation of the turbine engine (e.g., in-flight), the lubrication system may lose pressure (e.g., due to a failure of the lubricant pump or other components of the lubrication system), such that the lubrication system is unable to provide the lubricant to the gearbox assembly via the lubricant pump and the lubricant supply line.

The criticality of the lubricant interruptions increases when the bearings are journal bearings since the absence of lubricant at the journal bearings can lead to a journal bearing failure and subsequent gearbox failure, which may cause the low speed shaft to lock up permanently. Journal bearing seizure occurs when there is contact between the planet pin and the bore of the planet gear, thereby causing a significant increase of wear and friction. If journal bearing and pin contact occurs during high power operation this will lead to welding of the two components and consequent over-torque. Some gearbox assemblies include an auxiliary lubrication system to supply lubricant to the journal bearings and to the gears to prevent damage to the gearbox assembly due to inadequate lubricant supply during windmilling. Such auxiliary lubrication systems, however, typically require an additional pump (e.g., a fan-driven pump or an electrical pump) that adds weight to the turbine engine. The lubricant pump requires added complexity to provide the lubricant during high speeds, such as during operation of the turbine engine, and during low speeds, such as during windmilling (e.g., in-flight or on the ground). Further, the lubricant pump requires added complexity to provide the lubricant while the fan windmills in either direction (e.g., the fan rotates left or right).

Accordingly, the present disclosure provides a unidirectional fan brake to prevent rotation of the fan in an opposite direction of the operational direction in such windmilling conditions. The unidirectional fan brake is a passive fan brake. By preventing rotation of the fan in the opposite direction of the operational direction, the auxiliary lubrication system may be simplified by reducing or removing some of the additional required equipment that adds weight and complexity to the turbine engine. The unidirectional fan brake of the present disclosure may be provided at one or more positions within the engine between a rotating component, such as, but not limited to, the low-pressure shaft, and a static, nonrotating component, such as an engine frame. The unidirectional fan brake of the present disclosure may be any device that prevents relative rotation in one direction when the brake is engaged. Exemplary brakes disclosed herein include one-way clutches, such as a sprag clutch. The unidirectional fan brake of the present disclosure may operate as a brake for the fan, as described herein, or in other systems of the engine, such as, a multiple stage gearbox, propeller, or compound gearbox.

FIG. 1 shows a schematic, cross-sectional view of a turbine engine 100, taken along a longitudinal centerline axis 102 of the turbine engine 100, according to an embodiment of the present disclosure. The turbine engine 100 includes, in a downstream serial flow relationship, a fan section 104 including a fan 106, a compressor section 108 including a booster or a low-pressure (LP) compressor 110 and a high-pressure (HP) compressor 112, a combustion section 114 including a combustor 116, a turbine section 118 including a high-pressure (HP) turbine 120, a low-pressure (LP) turbine 122, and an exhaust nozzle 124. As shown in FIG. 1, the turbine engine 100 defines an axial direction A, a radial direction R, and a circumferential direction C. As shown and described herein, the turbine engine 100 is a ducted, indirect-drive, gas turbine engine 100.

The fan section 104 includes a fan casing 126, which is secured to a nacelle (omitted for clarity) surrounding the fan 106. The fan 106 includes a plurality of fan blades 128 disposed radially about the longitudinal centerline axis 102. The HP compressor 112, the combustor 116, and the HP turbine 120 form a turbo-engine 130 of the turbine engine 100, which generates combustion gases. The turbo-engine 130 is surrounded by a core casing 132, which is coupled to the fan casing 126. The fan casing 126 is supported relative to the turbomachine by circumferentially spaced outlet guide vanes 134.

A high-speed shaft 136, also referred to herein as a high-pressure shaft 136, is disposed coaxially about the longitudinal centerline axis 102 of the turbine engine 100 and drivingly connects the HP turbine 120 to the HP compressor 112. A low-speed shaft 138, also referred to herein as a low-pressure shaft 138, which is disposed coaxially about the longitudinal centerline axis 102 of the turbine engine 100 and within the larger diameter, annular, high-speed shaft 136, drivingly connects the LP turbine 122 to the LP compressor 110 and the fan 106 (either directly or indirectly through a gearbox assembly 140). The high-speed shaft 136 and the low-speed shaft 138 are rotatable about the longitudinal centerline axis 102.

The LP compressor 110 and the HP compressor 112, respectively, include a respective plurality of compressor stages 142, 144, in which a respective set of compressor blades 146, 148 rotate relative to a respective set of compressor vanes 150, 152 to compress or to pressurize gas entering through an inlet 154. Each compressor stage 144 of the HP compressor 112 includes multiple compressor blades 148 provided on a rotor disk 156 (or the blades and the disk are integrated together, referred to as a blisk), also referred to herein as rotor compressor blades 148 or rotor blades 148. Each compressor blade 148 extends radially outwardly relative to the longitudinal centerline axis 102, from a blade platform to a blade tip. Compressor vanes 152, also referred to herein as stator vanes 152, are positioned upstream/downstream of and adjacent to rotor compressor blades 148. The rotor disk 156 for a stage of compressor blades 148 is mounted to the high-speed shaft 136. The compressor stage 144 of the HP compressor 112 may refer to a single disk of rotor compressor blades 148 or may refer to both the single disk of rotor compressor blades 148 and an adjacent single disk of stator vanes 152. Either meaning can apply within the context of this disclosure without loss of clarity. The same description applies to each compressor stage 142 of the LP compressor 110 (e.g., each compressor stage 142 of the LP compressor 110 includes multiple compressor blades 146, also referred to as rotor blades 146, and stator compressor vanes 150).

The HP turbine 120 has one or two turbine stages 158. In a single turbine stage 158, turbine blades 160 are provided on a rotor disk 162, also referred to herein as rotor blades 160. Each turbine blade 160 extends radially outwardly relative to the longitudinal centerline axis 102, from a blade platform to a blade tip. The HP turbine 120 can also include stator turbine vanes 164, also referred to as stator turbine nozzles. The HP turbine 120 may have an upstream nozzle adjacent an exit of the combustor 116 and a downstream nozzle aft of the rotor (e.g., turbine blades 160) or the HP turbine 120 may have a nozzle upstream of the rotor blades (e.g., turbine blades 160) or downstream of the rotor blades.

Air exiting the HP turbine 120 enters the LP turbine 122, which has a plurality of turbine stages 166 of the rotor blades 168. The LP turbine 122 can have three, four, five, or six stages. In a single LP turbine stage 166 (containing a plurality of rotor blades 168 coupled to the low-speed shaft 138), the rotor blades 168 are provided on a rotor disk (connected to the low-speed shaft 138) and extend radially outwardly relative to the longitudinal centerline axis 102, from a blade platform to a blade tip. The LP turbine 122 can also include stator turbine vanes 170, also referred to as a stator turbine nozzles. The LP turbine 122 may have both an upstream nozzle and a downstream nozzle aft of a turbine stage 166, followed by the exhaust nozzle 124.

During operation of the turbine engine 100, a volume of air A1 enters the turbine engine 100 through an inlet 172 of the fan casing 126. As the volume of air A1 passes through the fan section 104 and across the fan blades 128, a first portion of air A2 of the air A1 is directed or routed into a bypass air flow passage 174 and a second portion of air A3 of the air A1 is directed or routed into the inlet 154 at an upstream section of a core air flow passage 176. The ratio between the first portion of air A2 and the second portion of air A3 is commonly known as a bypass ratio. The pressure of the second portion of air A3 is then increased as it is routed through the HP compressor 112 and into the combustion section 114, where the highly pressurized air is mixed with fuel and burned to provide combustion gases 178.

The combustion gases 178 are routed into the HP turbine 120 and expanded through the HP turbine 120 where a portion of thermal and/or kinetic energy from the combustion gases 178 is extracted via sequential stages of the HP turbine 120 turbine vanes 164 and rotor blades 160, which are coupled to the high-speed shaft 136, thus causing the high-speed shaft 136 to rotate, thereby supporting operation of the HP compressor 112. The combustion gases 178 are then routed into the LP turbine 122 and expanded through the LP turbine 122. Here, a second portion of thermal and kinetic energy is extracted from the combustion gases 178 via sequential stages of the LP turbine 122 turbine vanes 170 and the LP turbine rotor blades 168 that are coupled to the low-speed shaft 138, thus, causing the low-speed shaft 138 to rotate. The rotation of the low-speed shaft 138 thereby supports operation of the LP compressor 110 and rotation of the fan 106 (via the gearbox assembly 140, when present).

The combustion gases 178 are subsequently routed through the exhaust nozzle 124 to provide propulsive thrust. Simultaneously, the pressure of the first portion of air A2 is substantially increased as the first portion of air A2 is routed through the bypass air flow passage 174 before being exhausted from a fan nozzle exhaust 180, also providing propulsive thrust.

The turbine engine 100 is by way of example only. In other embodiments, the gas turbine engine may have any other suitable configuration, including, for example, any other suitable number or configurations of shafts or spools, fan blades, turbines, compressors, or a combination thereof. The gearbox assembly 140 may have any suitable configuration, including, for example, a star gear configuration, a planet gear configuration, a single-stage, a multi-stage, epicyclic, non-epicyclic, etc., as detailed further below. The gearbox assembly 140 may have a gear ratio in a range of 3:1 to 4:1, 3:5 to 4:1, 3.25:1 to 3.5:1, or 4:1 to 5:1. The fan assembly may be any suitable fixed-pitched assembly or variable-pitched assembly. The turbine engine 100 may include additional components not shown in FIG. 1, such as rotor blades, stator vanes, etc. The fan assembly may be configured in any other suitable manner (e.g., as a fixed pitch fan) and further may be supported using any other suitable fan frame configuration. Aspects of the present disclosure may be incorporated into any other suitable turbine engine, including, but not limited to, turbofan engines, propfan engines, turbojet engines, turboprop, and turboshaft engines, aviation-based turbine engines, marine-based turbine engines, land-based turbine engines, industrial turbine engines, power generation turbine engines, etc.

As noted, the high-pressure compressors and the high-pressure turbines and the low-pressure compressors and the low-pressure turbines include one or more stages each having two types of blades: stator blades and rotor blades. The blades, whether stator or rotor, are arranged in a circumferential manner about the longitudinal centerline axis 102 (FIG. 1). That is, each stage of the compressor and the turbine is associated with a ring or a circumferential row of stator blades and a ring or a circumferential row of rotor blades. The rotor blades or the stator blades are axisymmetric about the longitudinal centerline axis 102.

Figure 2:
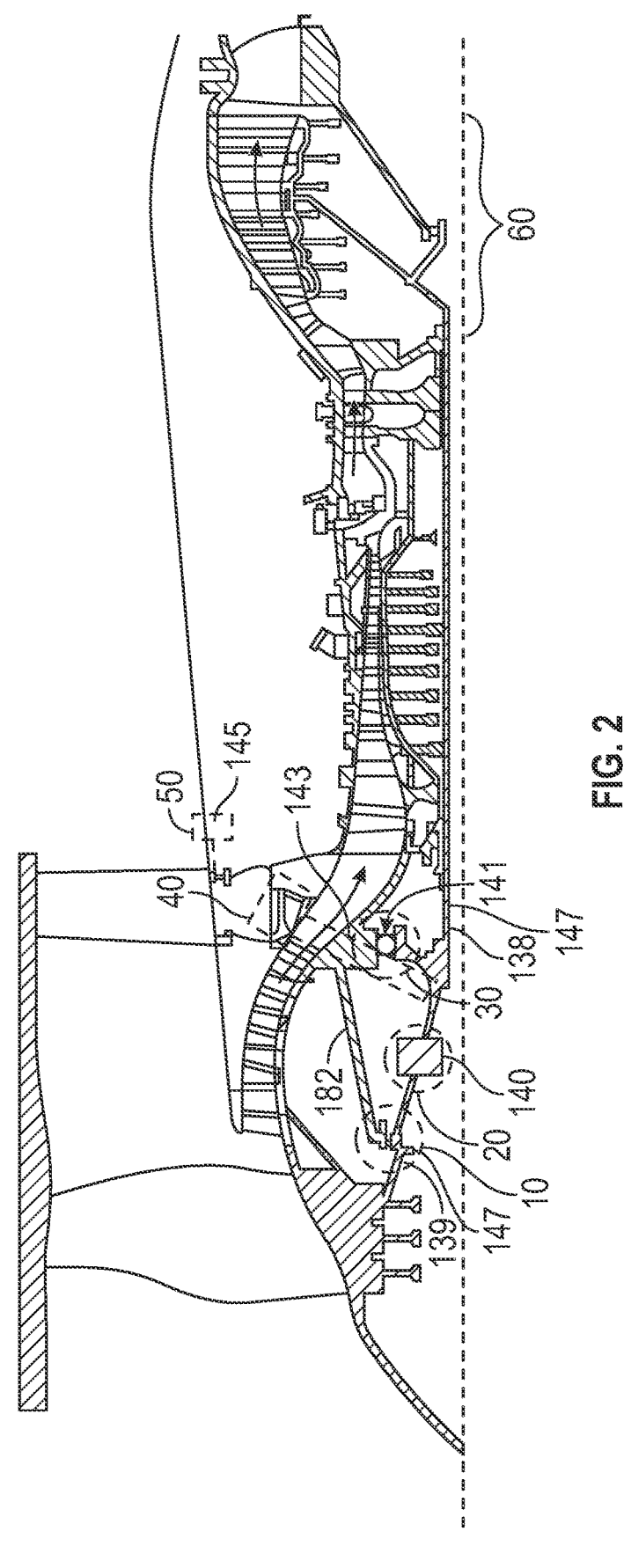
FIG. 2 illustrates a schematic, cross-sectional view of the gas turbine engine of FIG. 1 with optional locations for a unidirectional fan brake, according to the present disclosure.

FIG. 2 illustrates the turbine engine 100 of FIG. 1 highlighting different locations along the turbine engine 100 that a unidirectional brake according to the present disclosure may be located. As noted above, the unidirectional brake is included to prevent rotation of the fan blades 128 in an opposite direction of the direction of rotation during engine operation. The unidirectional brake is located between a rotational component and a static, nonrotating component. In some examples, the rotational component is the low-pressure shaft 138. In other cases, the rotational component is another rotating component that is directly or indirectly rotationally coupled to the low-pressure shaft 138. Accordingly, the unidirectional brake of the present disclosure may be located anywhere along the low-pressure rotor system (e.g., the low-pressure shaft, LP turbine, or LP compressor). The static, nonrotating component is a component that does not rotate, either during engine operation or in engine shutdown conditions. In some examples, the static, nonrotating component is an engine frame.

FIG. 2 illustrates six exemplary locations for the unidirectional brake, although, as noted above, other locations are contemplated. Since the turbine engine 100 is a schematic, all engine frame members are not visible in the view of FIG. 2. For example, a first location 10 for the unidirectional brake is between a fan shaft 139 rotationally coupled to the low-pressure shaft 138 and an engine frame 182. The engine frame 182 is a static nonrotating component of the turbine engine 100. The first location 10 may be anywhere along the fan shaft 139 up to and including, the gearbox assembly 140 (e.g., a second location 20). In some examples, the unidirectional brake is coupled to one or more bearing assemblies that are located forward of the gearbox assembly 140. The bearing assembly may rotationally support the fan shaft 139. The unidirectional brake may be coupled in a cold portion of the engine, that is, a portion of the engine forward of the combustion. In some examples, the unidirectional brake is coupled to the fan shaft 139 forward of any bearing assemblies that rotationally support the fan shaft 139. In some examples, the unidirectional brake is coupled in a location radially outward of any bearing assemblies supporting the fan shaft 139 in the first location 10. In such examples, the unidirectional brake continues to be coupled to a rotational component that is rotationally coupled to the fan shaft 139, such that prevention of rotation of the rotational component also prevents rotation of the fan shaft 139.

The second location 20 for the unidirectional brake is between a rotational component of the gearbox assembly 140, such as, for example, the sun gear, the ring gear, or the plurality of planet gears and the engine frame. The gearbox assembly 140 is illustrated schematically in FIG. 2, however, the gearbox assembly 140 is mounted to the engine frame 182 to allow for transfer of the torque from the low-pressure shaft 138 to the fan shaft, in the manner discussed above. The unidirectional brake may be coupled to a rotational shaft extending from the gearbox assembly 140, such as the input shaft or output shaft. In some examples, the second location 20 is any location rotationally coupled to the gearbox assembly 140. For example, the second location 20 may be an output shaft of the gearbox assembly that is rotationally coupled to the fan shaft. In some examples, the output shaft extends from a ring gear of the gearbox assembly 140 (in a star configuration of the gearbox assembly 140). In some examples, the output shaft extends from a carrier of the planet gears (in a planetary configuration of the gearbox assembly 140). In some examples, the second location is coupled to any of the gears of the gearbox assembly 140 (e.g., the sun gear, the two or more planet gears, or the ring gear, or combinations thereof). In some examples, the second location 20 is an input shaft of the gearbox assembly 140. In some examples, the second location 20 is within the gear sump, that is, a location aft of the gearbox assembly 140 and forward of a third location 30.

The third location 30 for the unidirectional brake is at a forward bearing assembly 141, also referred to as the primary thrust bearing between the low-pressure shaft 138 and the engine frame 182. The forward bearing assembly 141 supports the low-pressure shaft 138. The third location 30 may be forward or aft of the forward bearing assembly 141. The same variations discussed with respect to the first location 10 apply to the third location 30 with respect to the various locations in relation to the bearing assembly.

A fourth location 40 for the unidirectional brake is at a power take off device 143 rotationally coupled to the low-pressure shaft 138 between the power take off device 143 and the engine frame 182. The fourth location 40 may allow for preventing rotation of the power take off device 143, thus preventing rotation of the low-pressure shaft 138.

A fifth location 50 is at an accessory gearbox 145 between one of the gears of the accessory gearbox 145 and the engine frame 182. The accessory gearbox 145 is configured to transmit torque and power to one or more accessories of the turbine engine 100. A sixth location 60 is anywhere within a sump area of the turbine engine 100. For example, the sixth location 60 may be between the low-pressure shaft 138 or a shaft extension piece of the low-pressure shaft 138 and the engine frame. The sixth location 60 may be located at one or more of the bearing assembly locations coupled to the low-pressure shaft 138. The unidirectional brake may be located at any bearing assembly within the turbine engine 100 that is operationally coupled to the fan shaft 139 or the low-pressure shaft 138.

A unidirectional brake may be located at any one or more of the aforementioned locations, including, any combination of two or more of the aforementioned locations. Thus, the turbine engine 100 may include a single unidirectional brake or a plurality of unidirectional brakes. In some examples, the unidirectional brake may be coupled to any of the rotational components that are rotationally coupled to the low-pressure shaft 138 such that prevention of rotation of the rotational component also prevents rotation of the low-pressure shaft 138. This may include, for example, rotors, blades, shafts, bearings, gears, shafts, airfoils, etc. of the turbine engine 100. This includes, for example, components of the low-pressure turbine 122 (FIG. 1), the low-pressure compressor 110 (FIG. 1), the low-pressure shaft 138, the high-pressure turbine 120 (FIG. 1), the high-pressure shaft 136 (FIG. 1), the high-pressure compressor 112 (FIG. 1), or combinations thereof.

As is well-known in the art, additional bearing assemblies are located within the turbine engine 100 to facilitate relative rotation of various components. The unidirectional brake may be located at any bearing assembly between a rotational component that, directly or indirectly, drives rotation of the fan blades 128 (FIG. 1). For example, locations 10 and 30 both include bearing assemblies at which the unidirectional brake may be located. In such examples, the rotational component may be a rotational component 147 that may be the fan shaft 139 (e.g., for the first location 10) or the low-pressure shaft 138.

In each of the aforementioned examples, the unidirectional brake is a passive brake and is located between a rotating component that is rotationally coupled to the fan blades 128 and a static, nonrotating component. This allows the unidirectional brake to achieve the prevention of rotation of the rotating component, and, thus, the fan blades 128, in the direction opposite of the direction of rotation. For example, in FIG. 3, the first location 10 (FIG. 2) is illustrated with the remaining portions of the turbine engine 100 (FIG. 2) omitted for clarity.

Figure 3:
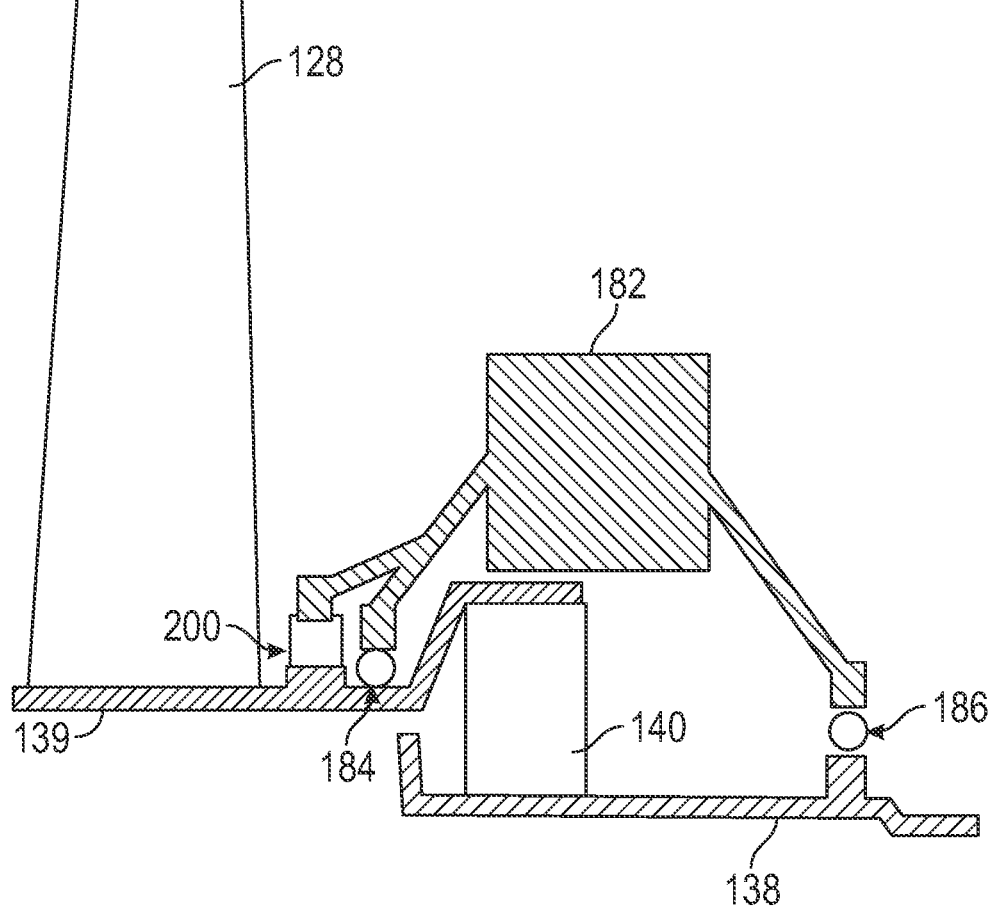
FIG. 3 illustrates a partial schematic, cross-sectional view of the gas turbine engine of FIG. 1 including a unidirectional fan brake, according to the present disclosure.

In FIG. 3, a unidirectional brake 200 is mounted between the fan shaft 139 and the engine frame 182. During engine operation, the low-pressure shaft 138 rotates about a longitudinal centerline axis of the turbine engine 100 (FIG. 1). A bearing 186 allows rotation of the low-pressure shaft 138 with respect to the engine frame 182, which does not rotate. The gearbox assembly 140 transfers the rotation of the low-pressure shaft 138 to the fan shaft 139 as described previously. A bearing 184 allows rotation of the fan shaft 139 with respect to the engine frame 182. Therefore, during engine operation, the low-pressure shaft 138 effectuates rotation of the fan blades 128 about the longitudinal centerline axis 102 (FIG. 1) in a first direction that is a direction of fan rotation when producing positive thrust during engine operation (e.g., fan rotation during normal operation).

The unidirectional brake 200 allows rotation of the fan shaft 139 with respect to the static engine frame 182 in the first direction. As is discussed in more detail to follow, this is because the unidirectional brake 200 is disengaged. In the disengaged condition, relative rotation is permitted. When the engine 100 (FIG. 1) is off and the low-pressure shaft 138 is not being powered by the turbine engine 100 to rotate, rotation of the fan blades 128 is prevented in a second direction opposite the first direction. The second direction is a direction that is the direction opposite of fan rotation. In this engine off condition, if air passing through the fan blades 128 works to rotate the fan blades 128 in the opposite direction that the fan rotates during normal operation, the unidirectional brake 200 automatically becomes engaged and such rotation is prevented due to a locking between the unidirectional brake 200 and the static engine frame 182. Rotation of the fan blades 128 in the direction of fan rotation (e.g., the direction of the fan when producing positive thrust during engine operations) is still permitted in an engine off condition.

FIGS. 4A to 6B illustrate exemplary unidirectional brakes that may be located at any of the locations described with respect to FIG. 2 and/or may be the unidirectional brake 200 described with respect to FIG. 3.

Figures 4A, 4B:
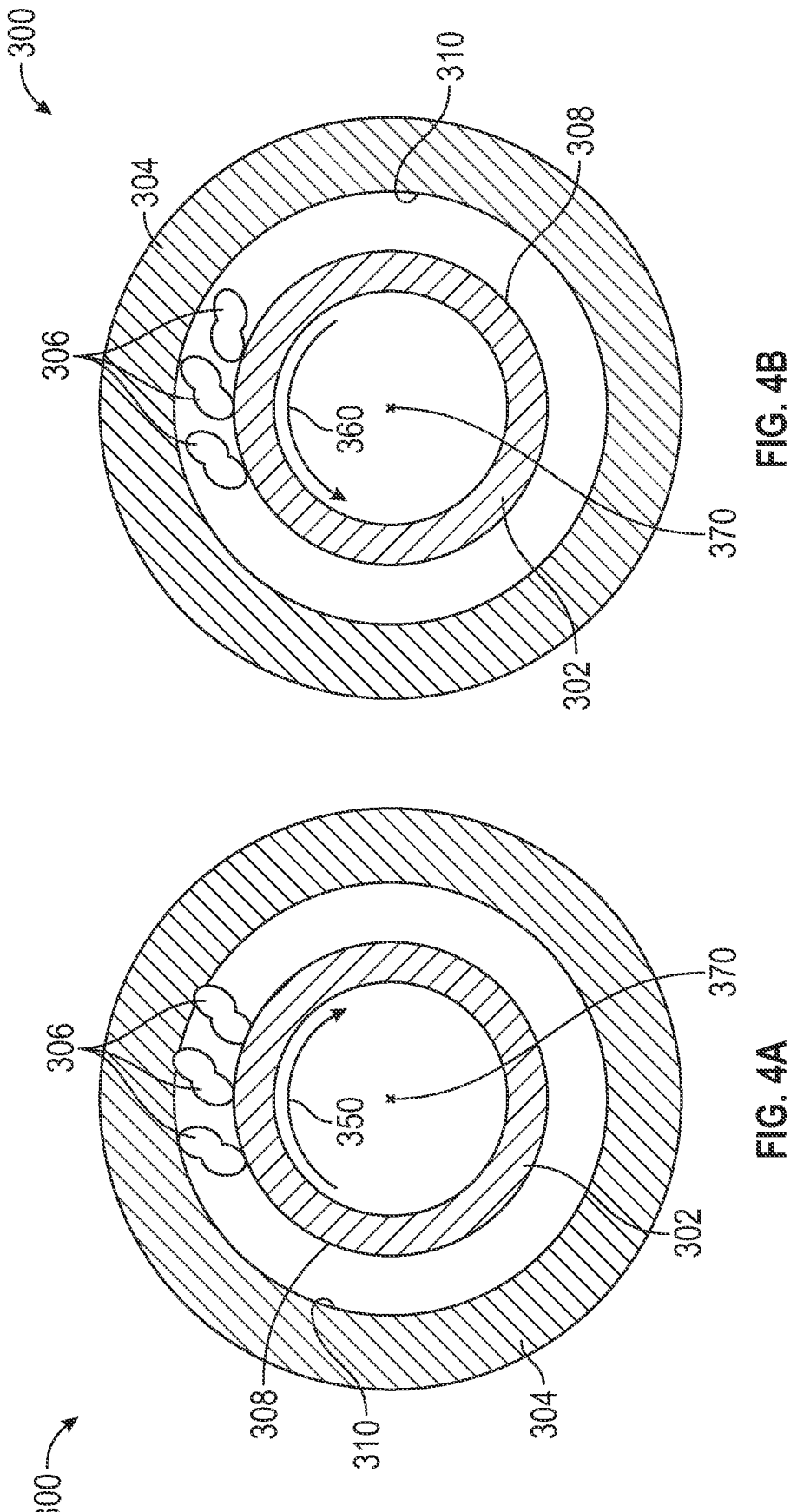
FIG. 4A illustrates a cross-sectional end view of a unidirectional fan brake, in a locked position according to the present disclosure.
FIG. 4B illustrates a cross-sectional end view of a unidirectional fan brake, in an unlocked position according to the present disclosure.

FIGS. 4A and 4B illustrate an exemplary unidirectional brake 300. The unidirectional brake 300 includes a first member 302 and a second member 304. Between the first member 302 and the second member 304 are located a plurality of clutch elements 306 connected to an outer surface 308 of the first member 302. FIG. 4A illustrates an engine off condition and FIG. 4B illustrates an engine operating condition. In FIGS. 4A and 4B, the clutch elements 306 tilt circumferentially in a fan operational rotation direction (FIG. 4A) and in a direction opposite of the fan operational rotation direction (e.g., FIG. 4B) to engage and to disengage, respectively.

The movement of the clutch elements 306 between the position of FIG. 4A and the position of FIG. 4B is passive and occurs automatically due to the direction of rotation of the unidirectional brake 300. The passive actuation is caused by the natural friction between the rotor portion (e.g., first member 302), the clutch elements 306, and the stator portion (e.g., second member 304). That is, when the first member 302 rotates in the direction of fan operation during normal operation, the clutch elements 306 are caused to circumferentially tilt to a position opposite of the rotational direction to allow relative rotation of the first member 302 with respect to the second member 304 (e.g., FIG. 4B). When rotation occurs in the opposite direction, the clutch elements 306 are caused to be maintained in the engaged or locked position or are caused to be circumferentially tilted back from the disengaged position to the engaged position to prevent relative rotation.

Starting with FIG. 4B, when the engine is rotating about an engine axis 370 in the direction of fan rotation 360 when producing positive thrust, the plurality of clutch elements 306 are oriented such that the plurality of clutch elements 306 are not locked or engaged with either or both of an inner surface 310 of the second member 304 or an outer surface 308 of the first member 302. In this position, the first member 302 and the plurality of clutch elements 306 are permitted to rotate in the direction of fan rotation 360 relative to the second member 304. Considering this view in conjunction with FIG. 3, the first member 302 may be coupled to the fan shaft 139 and the second member 304 may be coupled to the engine frame 182. When the engine is operating such that the low-pressure shaft 138 is rotating the fan blades 128, the unidirectional brake 200 is in the condition of FIG. 4B. In the condition of FIG. 4B when positive thrust operation exists, lubrication may be provided to the unidirectional brake 200 to prevent or to reduce wear on the components thereof (e.g., the plurality of clutch elements 306).

In an engine off condition, the fan is not driven to rotate in the direction of fan rotation 360. Referring now to FIG. 4A, to prevent windmilling in such a condition in an opposite direction of fan rotation 350, the unidirectional brake 300 engages. That is, the first member 302 attempts to rotate in the opposite direction of fan rotation 350, the clutch elements 306 engage or lock with the inner surface 310 of the second member 304. This locks or engages the first member 302 and the second member 304 together such that relative rotation between the members is not permitted. When the second member 304 is connected to a static member, the first member 302 is locked with respect to the static member and no rotation in the opposite direction of fan rotation 350 is permitted. Considering this view in conjunction with FIG. 3, the first member 302 may be coupled to the fan shaft 139 and the second member 304 may be coupled to the engine frame 182. When the engine is in an engine off condition, the low-pressure shaft 138 is not being driven by the turbine engine 100 (FIG. 1) to rotate. If windmilling causes the fan blades 128 to rotate in the opposite direction of fan rotation 350, the unidirectional brake 200 is in the condition of FIG. 4A. Because the static engine frame 182 cannot rotate, when the clutch elements 306 are engaged, the fan shaft 139 is locked to the static engine frame 182 and cannot rotate in the opposite direction of fan rotation 350.

Although the aforementioned description contemplates the second member 304 being coupled to a static member and the first member 302 being coupled to a rotating member, the orientation may be reversed. Likewise, though FIG. 4B illustrates the direction of fan rotation 360 in a counterclockwise direction and the opposite direction of fan rotation 350 in a clockwise direction, the rotations may be reversed. Such reversal may result in the clutch elements 306 being angled in a mirror condition as that shown in FIGS. 4A and 4B. Although the clutch elements 306 are described as coupled to the first member 302, the clutch elements may be coupled to the second member 304.

Figure 5:
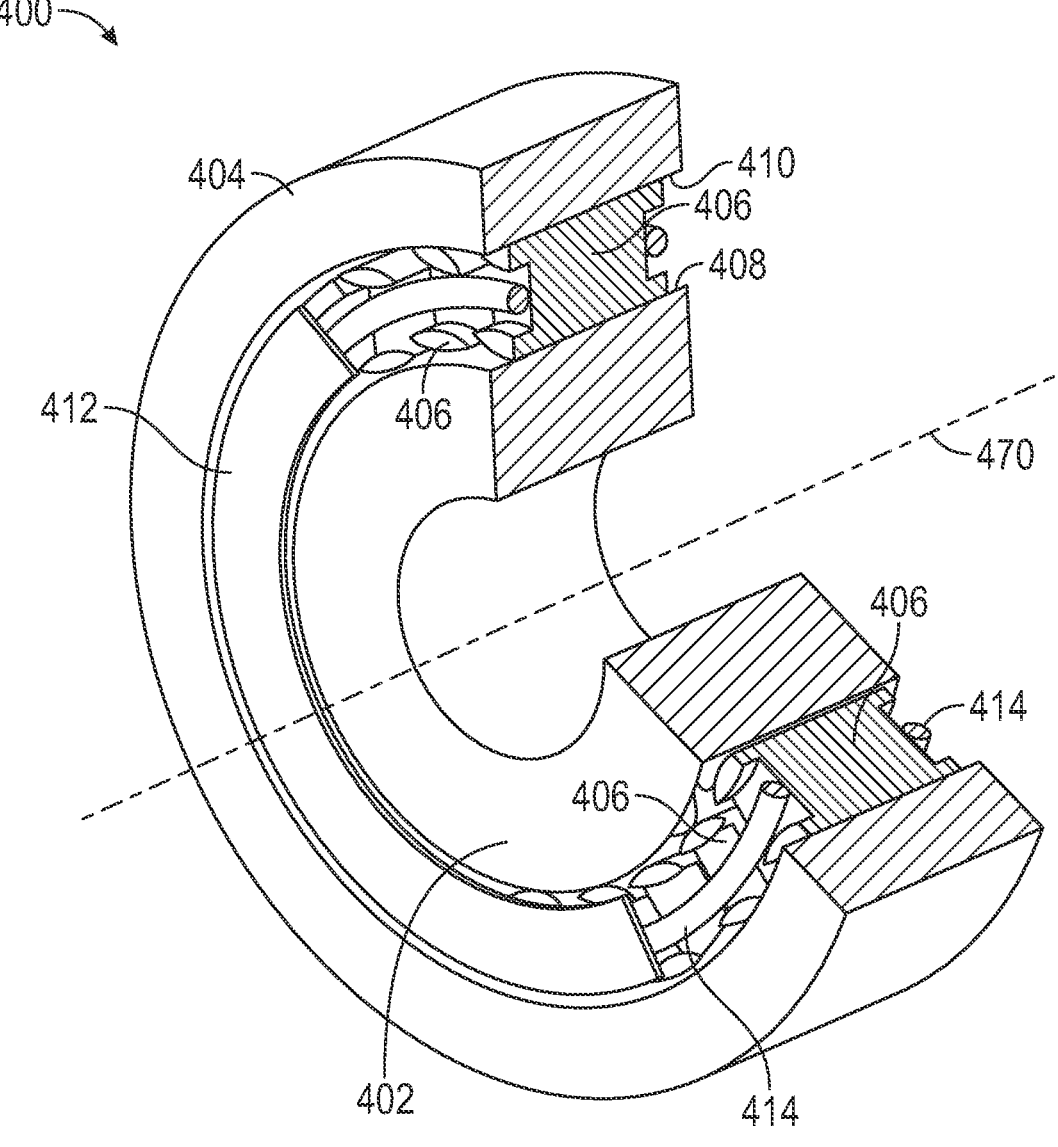
FIG. 5 illustrates a partial cutaway cross-sectional view of a unidirectional fan brake with a section removed, according to the present disclosure.

FIG. 5 illustrates an exemplary unidirectional brake 400. The unidirectional brake 400 operates in the same manner described above with respect to FIGS. 4A and 4B. The unidirectional brake 400 includes a first member 402, a second member 404, and a plurality of clutch elements 406 therebetween. The first member 402, the second member 404, and the plurality of clutch elements 406 are circumferentially located around a longitudinal centerline axis 470. A cage 412 may be located on both a forward distal end and aft distal end of the unidirectional brake 400, only the forward distal end being visible in FIG. 5. One or more springs 414 may support the plurality of clutch elements

406. As with the unidirectional brake 300, the clutch elements 406 (which may be wedges) may be located between an outer surface 408 of the first member 402 and an inner surface 410 of the second member 404 in an engaged position. In a disengaged position, the clutch elements 406 may be spaced from the inner surface 410.

Figures 6A, 6B:
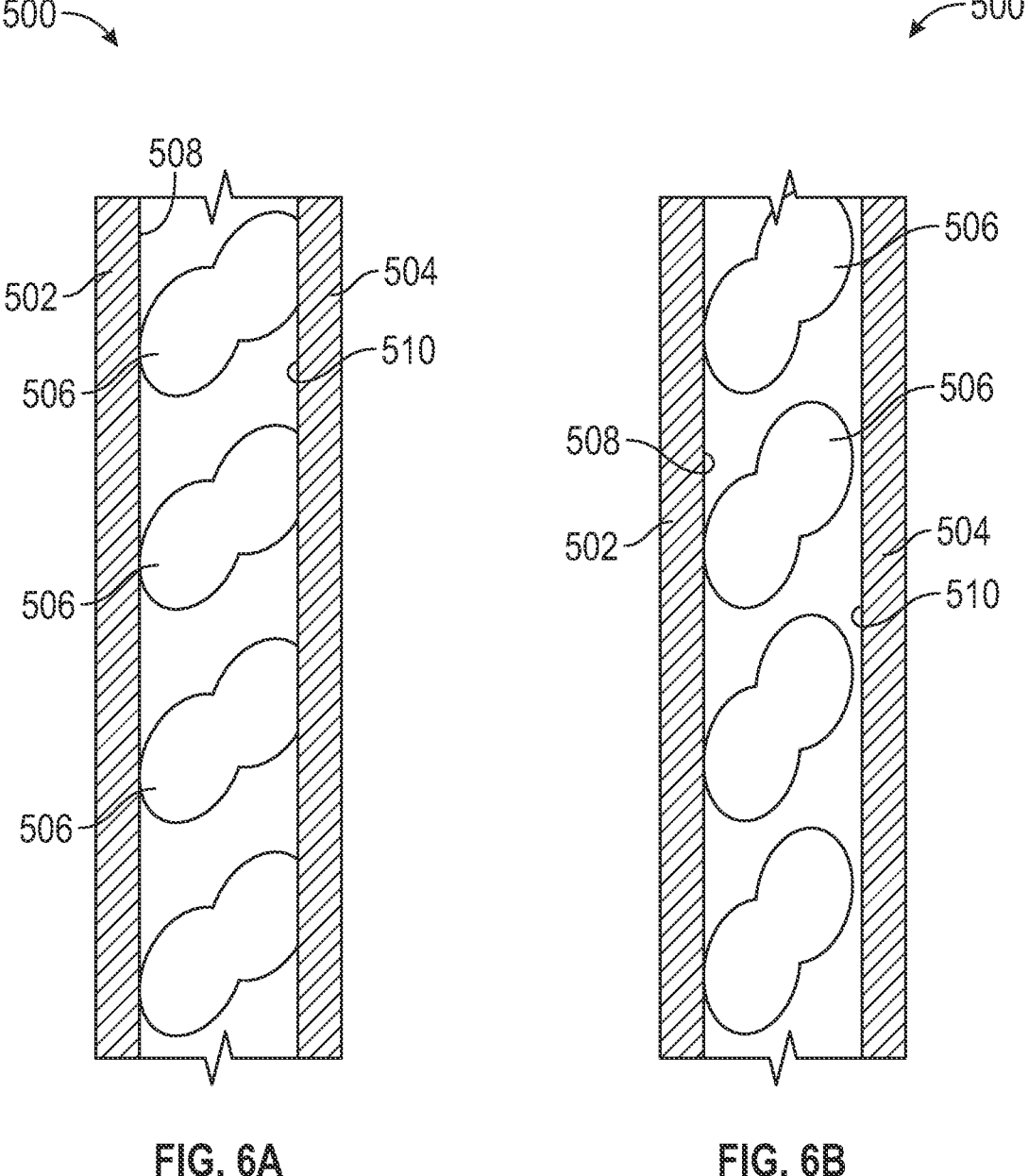
FIG. 6A illustrates a cross-sectional end view of a unidirectional fan brake, in a locked position according to the present disclosure.
FIG. 6B illustrates a cross-sectional end view of a unidirectional fan brake, in an unlocked position according to the present disclosure.

The unidirectional brake 300 (FIGS. 4A and 4B) and the unidirectional brake 400 are arranged such that engaging/disengaging occur in a circumferential direction about the longitudinal centerline axis. The unidirectional brake of the present disclosure, however, need not be orientated as such and could be oriented such that the engaging/disengaging occur due to axial motion or radial motion between two components. For example, the unidirectional brake 500 illustrated in FIGS. 6A and 6B prevents relative rotation of the fan blades 128 (FIG. 3) due to locking or engaging in an axial direction. The operation is similar to that of the aspects shown in FIGS. 4A to 5. That is, in FIG. 6B, during operation in the direction of fan rotation, a plurality of clutch elements 506 are disengaged such that relative motion between a first member 502 and a second member 504 is permitted. In FIG. 6A, the plurality of clutch elements 506 are located between an axially facing surface 508 (aft facing in FIG. 6A, though forward facing is contemplated) of the first member 502 and an axially facing surface 510 (forward facing in FIG. 6A, though aft facing is contemplated) of the second member 504. Accordingly, in FIGS. 6A and 6B, the clutch elements 506 tilt forward (e.g., FIG. 6A) and aft (e.g., FIG. 6B) to engage and to disengage, respectively.

Figure 6C:
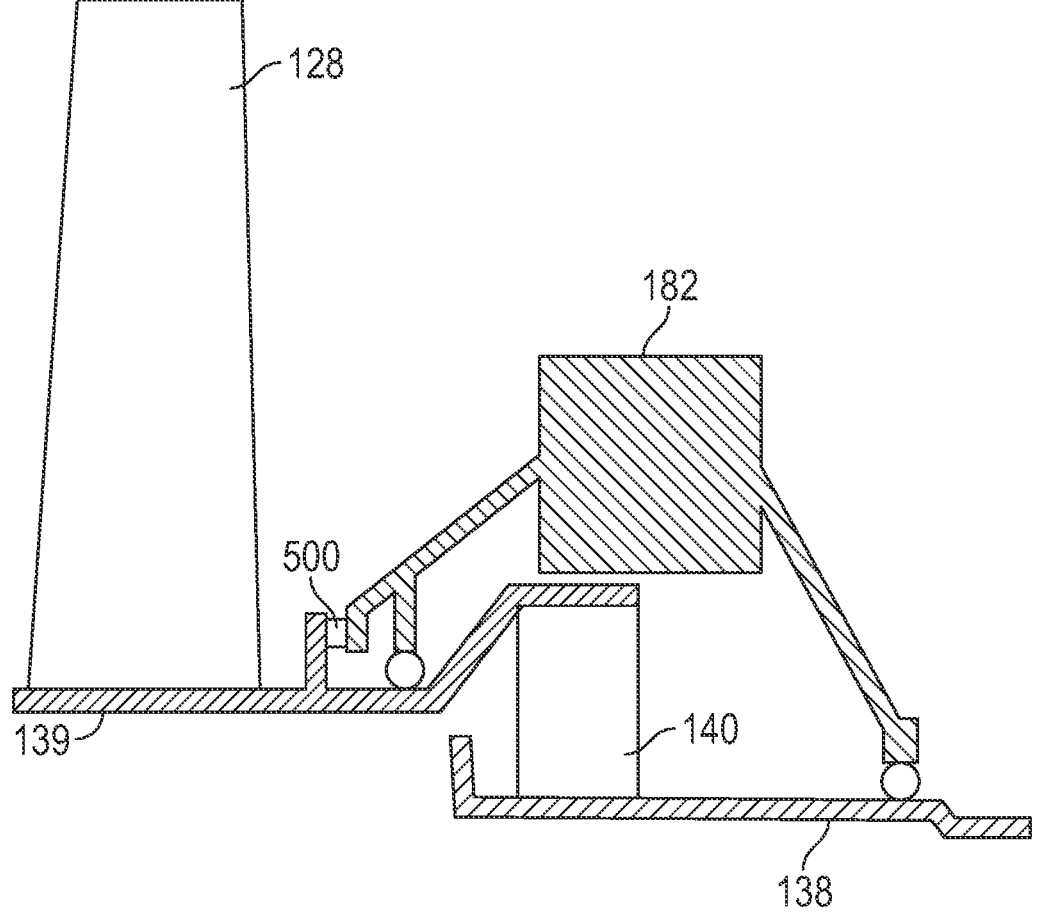
FIG. 6C illustrates a partial schematic, cross-sectional view of the gas turbine engine of FIG. 1 including the unidirectional fan brake of FIG. 6A, according to the present disclosure.

Considering FIGS. 6A and 6B in conjunction with FIG. 6C, the first member 502 may be coupled to a radially extending surface of the fan shaft 139 and the second member 504 may be coupled to a radially extending surface of the engine frame 182. Accordingly, during rotation of the low-pressure shaft 138, the unidirectional brake 500 is in the condition of FIG. 6B allowing the fan blades 128 to rotate relative to the engine frame 182. In windmilling conditions, the unidirectional brake 500 is in the condition of FIG. 6A preventing rotation of the fan blades 128 in the opposite direction of fan rotation.

Although the unidirectional brakes of the present disclosure have been described with respect to particular components, one or more of the unidirectional brakes may be coupled between a rotational component that, directly or indirectly, drives rotation of the fan blades 128 and a static nonrotating component.

Accordingly, the unidirectional brakes of the present disclosure prevent rotation of the fan blades in an opposite direction of fan rotation during engine off or windmilling conditions. The unidirectional brakes of the present disclosure may be a unidirectional clutch, a sprag clutch, an overrunning clutch, a ratcheting clutch, a Lowell ratchet clutch, or any other unidirectional rotational limiter.

The unidirectional brakes of the present disclosure are passive brakes, meaning that the brakes automatically engage when the fan blades begin to rotate in the opposite direction of fan rotation.

Further aspects are provided by the subject matter of the following clauses.

A turbine engine having a longitudinal centerline axis, the turbine engine having a fan having a plurality of fan blades configured to rotate in a first direction about the longitudinal centerline axis, a fan shaft configured to drive rotation of the fan in the first direction, and a unidirectional brake configured to prevent rotation of the fan in a second direction opposite the first direction.

A turbine engine having a longitudinal centerline axis. The turbine engine including a fan, a turbo-engine, and a unidirectional brake. The fan comprising a plurality of fan blades that rotate in a first direction about the longitudinal centerline axis. The turbo-engine including a combustor that combusts compressed air and fuel to generate combustion gases and a low-pressure turbine including a low-pressure shaft. The low-pressure turbine receives the combustion gases to rotate the low-pressure turbine. The fan is coupled to the low-pressure shaft such that rotation of the low-pressure shaft causes the fan to rotate in the first direction. The unidirectional brake is coupled to the low-pressure shaft to prevent rotation of the low-pressure shaft and, thus, the fan in a second direction opposite the first direction.

The turbine engine of any preceding clause, the unidirectional brake being a passive brake.

The turbine engine of any preceding clause, the unidirectional brake being a sprag clutch, an overrunning clutch, or a one-way clutch.

The turbine engine of any preceding clause, the first direction being a direction of fan rotation to produce positive thrust and the second direction is a direction opposite of fan rotation.

The turbine engine of any preceding clause, the unidirectional brake comprising a first member coupled to a rotating member of the turbine engine and a second member coupled to a nonrotating member of the turbine engine.

The turbine engine of any preceding clause, the unidirectional brake being coupled between the fan shaft and an engine frame.

The turbine engine of any preceding clause, the engine further comprising a low-pressure shaft configured to rotate the fan shaft, the unidirectional brake being coupled to the low-pressure shaft.

The turbine engine of any preceding clause, the engine further comprising a power take off device, the unidirectional brake coupled to the power take off device.

The turbine engine of any preceding clause, further comprising a gearbox assembly operationally coupling the low-pressure shaft to the fan shaft, the unidirectional brake being coupled to the gearbox assembly.

The turbine engine of any preceding clause, the unidirectional brake being coupled to a bearing assembly of the turbine engine.

The turbine engine of any preceding clause, the unidirectional brake being coupled to an accessory gearbox assembly.

The turbine engine of any preceding clause, the unidirectional brake being coupled to the turbine engine in a sump region of the turbine engine.

The turbine engine of any preceding clause, the unidirectional brake comprising a plurality of clutch elements that tilt circumferentially to engage and to disengage the unidirectional brake.

The turbine engine of any preceding clause, the unidirectional brake comprising a plurality of clutch elements that tilt axially to engage and to disengage the unidirectional brake. The turbine engine of any preceding clause, the unidirectional brake includes a plurality of clutch elements that tilt in a circumferential direction of the unidirectional brake to engage and to disengage the unidirectional brake.

The turbine engine of any preceding clause, the unidirectional brake includes a plurality of clutch elements that tilt in an axial direction of the unidirectional brake to engage and to disengage the unidirectional brake.

The turbine engine of any preceding clause, the first direction is a direction of fan rotation to produce positive thrust.

The turbine engine of any preceding clause, the fan includes a fan shaft coupled to the fan, and the turbine engine further comprises an engine frame, the unidirectional brake being coupled between the fan shaft and the engine frame.

The turbine engine of any preceding clause, the fan includes a fan shaft coupled to the fan, and the turbine engine further comprises a gearbox assembly arranged between the low-pressure shaft and a fan shaft, the unidirectional brake being coupled to the gearbox assembly.

The turbine engine of any preceding clause, further comprising a power take off device coupled to the low-pressure shaft, the unidirectional brake coupled to the power take off device.

The turbine engine of any preceding clause, further comprising a rotational component coupled to the low-pressure shaft, the rotational component being supported by a bearing assembly and the unidirectional brake being coupled to the bearing assembly.

A method of operating a turbine engine having a longitudinal centerline axis. The method includes combusting compressed air and fuel in a combustor to generate combustion gases, rotating a low-pressure turbine and a low-pressure shaft of the low-pressure turbine with the combustion gases, rotating a fan comprising a plurality of fan blades in a first direction about the longitudinal centerline axis when the low-pressure shaft is rotated, the low-pressure shaft being coupled to the fan, and engaging a unidirectional brake coupled to the low-pressure shaft to prevent rotation of the low-pressure shaft and, thus, the fan in a second direction opposite the first direction when the low-pressure shaft is not rotating the fan in the first direction.

The method of any preceding clause, further comprising a rotational component coupled to the low-pressure shaft, the rotational component being supported by a bearing assembly and the unidirectional brake being coupled to the bearing assembly.

The method of any preceding clause, wherein rotating the fan includes rotating a fan shaft coupled to the fan and the low-pressure shaft, the unidirectional brake being coupled between the fan shaft and an engine frame of the turbine engine.

The method of any preceding clause, wherein rotating the fan includes rotating a fan shaft coupled to the fan and the low-pressure shaft, the unidirectional brake being coupled to a gearbox assembly arranged between the low-pressure shaft and a fan shaft.

The method of any preceding clause, further comprising rotating a power take off device coupled to the low-pressure shaft when the low-pressure shaft is rotated, the unidirectional brake coupled to the power take off device.

The method of any preceding clause, wherein the unidirectional brake being coupled to a bearing assembly supporting a rotational component coupled to the low-pressure shaft.

The method of any preceding clause, wherein the unidirectional brake is a passive brake.

The method of any preceding clause, wherein the unidirectional brake is a sprag clutch, an overrunning clutch, or a one-way clutch.

The method of any preceding clause, further comprising disengaging the unidirectional brake to allow the fan to rotate in the first direction.

The method of any preceding clause, wherein the unidirectional brake includes a plurality of clutch elements that tilt in a circumferential direction of the unidirectional brake to engage and to disengage the unidirectional brake.

The method of any preceding clause, wherein the unidirectional brake includes a plurality of clutch elements that tilt in an axial direction of the unidirectional brake to engage and to disengage the unidirectional brake.

Although the foregoing description is directed to the preferred embodiments of the present disclosure, other variations and modifications will be apparent to those skilled in the art and may be made without departing from the spirit or the scope of the disclosure. Moreover, features described in connection with one embodiment of the present disclosure may be used in conjunction with other embodiments, even if not explicitly stated above.

The invention claimed is:

1. A turbine engine having a longitudinal centerline axis, the turbine engine comprising:
   a fan comprising a fan shaft and a plurality of fan blades coupled to the fan shaft that rotate in a first direction about the longitudinal centerline axis;
   a turbo-engine comprising a combustor that combusts compressed air and fuel to generate combustion gases and a low-pressure turbine including a low-pressure shaft, the low-pressure turbine receiving the combustion gases to rotate the low-pressure turbine, the fan shaft being coupled to the low-pressure shaft such that rotation of the low-pressure shaft causes the fan to rotate in the first direction;
   a gearbox assembly that drivingly connects the low-pressure shaft and the fan shaft; and
   a unidirectional brake coupled to the gearbox assembly and configured to directly engage the gearbox assembly to prevent rotation of the fan shaft via the gearbox assembly, thus, preventing rotation of the fan in a second direction, opposite the first direction.

2. The turbine engine claim 1, wherein the unidirectional brake is a passive brake.

3. The turbine engine of claim 1, wherein the unidirectional brake is a sprag clutch, an overrunning clutch, or a one-way clutch.

4. The turbine engine of claim 1, wherein the unidirectional brake includes a plurality of clutch elements that tilt in a circumferential direction of the unidirectional brake to engage and to disengage the unidirectional brake.

5. The turbine engine of claim 1, wherein the unidirectional brake includes a plurality of clutch elements that tilt in an axial direction of the unidirectional brake to engage and to disengage the unidirectional brake.

6. The turbine engine of claim 1, wherein the first direction is a direction of fan rotation to produce positive thrust.

7. The turbine engine of claim 1, further comprising an engine frame, the unidirectional brake being coupled between the gearbox assembly and the engine frame.

8. The turbine engine of claim 1, wherein the unidirectional brake is coupled to a rotational component of the gearbox assembly.

9. The turbine engine of claim 8, wherein the unidirectional brake is directly coupled to an output shaft extending from the rotational component of the gearbox assembly such that the unidirectional brake directly engages the output shaft to prevent rotation of the fan shaft via the gearbox assembly.

10. The turbine engine of claim 8, wherein the gearbox assembly has a planetary gear configuration, the rotational component of the gearbox assembly being one or more of a sun gear, a ring gear, or a plurality of planet gears of the gearbox assembly.

11. A method of operating a turbine engine having a longitudinal centerline axis, the method comprising:

combusting compressed air and fuel in a combustor to generate combustion gases;

rotating a low-pressure turbine and a low-pressure shaft of the low-pressure turbine with the combustion gases;

rotating a fan comprising a fan shaft and a plurality of fan blades in a first direction about the longitudinal centerline axis when the low-pressure shaft is rotated, the low-pressure shaft being coupled to the fan shaft via a gearbox assembly; and engaging a unidirectional brake that is coupled to the gearbox assembly such that the unidirectional brake directly engages the gearbox assembly to prevent rotation of the fan shaft via the gearbox assembly, thus, preventing rotation of the fan in a second direction, opposite the first direction, when the low-pressure shaft is not rotating the fan in the first direction.

12. The method of claim 11, wherein the unidirectional brake is coupled between the gearbox assembly and an engine frame of the turbine engine.

13. The method of claim 11, wherein the unidirectional brake is a passive brake.

14. The method of claim 11, wherein the unidirectional brake is a sprag clutch, an overrunning clutch, or a one-way clutch.

15. The method of claim 11, further comprising disengaging the unidirectional brake from the gearbox assembly to allow the fan to rotate in the first direction.

16. The method of claim 15, wherein the unidirectional brake includes a plurality of clutch elements that tilt in a circumferential direction of the unidirectional brake to engage and to disengage the unidirectional brake.

17. The method of claim 15, wherein the unidirectional brake includes a plurality of clutch elements that tilt in an axial direction of the unidirectional brake to engage and to disengage the unidirectional brake.

18. The method of claim 11, wherein the unidirectional brake is directly coupled to a rotational component of the gearbox assembly such that the unidirectional brake directly engages the rotational component to prevent rotation of the fan shaft.

19. The method of claim 18, wherein the gearbox assembly has a planetary gear configuration, the rotational component of the gearbox assembly being one or more of a sun gear, a ring gear, or a plurality of planet gears of the gearbox assembly.

20. A turbine engine having a longitudinal centerline axis, the turbine engine comprising:

a fan comprising a fan shaft and a plurality of fan blades coupled to the fan shaft that rotate in a first direction about the longitudinal centerline axis;

a turbo-engine comprising a combustor that combusts compressed air and fuel to generate combustion gases and a low-pressure turbine including a low-pressure shaft, the low-pressure turbine receiving the combustion gases to rotate the low-pressure turbine, the fan shaft being coupled to the low-pressure shaft such that rotation of the low-pressure shaft causes the fan to rotate in the first direction; and a unidirectional brake coupled to the fan shaft or the low-pressure shaft and including a plurality of clutch elements that is located between a first axial surface of a first member and a second axial surface of a second member, the unidirectional brake being configured to move from a disengaged position, in which rotation of the fan in the first direction is permitted, to an engaged configuration, in which the plurality of clutch elements tilt in an axial direction and engages the first axial surface and the second axial surface to prevent rotation of the fan in a second direction, opposite the first direction, via the fan shaft or the low-pressure shaft.

* * * * *